United States Patent Office 3,111,509
Patented Nov. 19, 1963

3,111,509
STABLE, HIGH SOFTENING, VINYL CYCLOBUTANE HOMOPOLYMERS AND METHOD FOR PREPARING SAME
Vernon L. Folt, Akron, Ohio, assignor to The B. F. Goodrich Company, New York, N.Y., a corporation of New York
No Drawing. Filed Oct. 5, 1961, Ser. No. 143,053
9 Claims. (Cl. 260—91.5)

This invention relates to novel halogen containing synthetic polymers having unusually high softening temperatures and exceptional resistance to chemicals, heat and light and more particularly pertains to novel homopolymers of a specific type of halogenated vinyl cyclobutane and to the method for preparing same.

The preparation of monomers having the general formula,

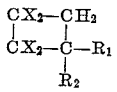

wherein at least two of the X's are fluorine and those remaining are hydrogen or halogen and $R_1$ and $R_2$ are hydrogen, halogen or other atoms or radicals, are disclosed in U.S. Patent No. 2,462,345. The preparation and polymerization of the reaction products of polyfluoroethylenes and terminally unsaturated compounds is disclosed and claimed in U.S. Patent No. 2,462,347. Similar reactions and types of compounds are also disclosed in British Patent No. 863,721, U.S. Patent No. 2,462,346 and in the Journal of the American Chemical Society, 71, 490–496 (1949).

In view of the foregoing art the present invention is indeed unobvious and unexpected.

It is an object of the present invention to provide a novel polymer having a softening temperature and useful temperature range in excess of 100° C. Another object is the provision of a novel polymer possessing outstanding resistance to degradation by heat. Still another object is the provision of a novel polymer having excellent physical properties which is highly suited for injection molding. Yet another object is the provision of a novel polymer capable of being melt spun to form useful fibers which can be drawn.

That these and other objects have been accomplished by the present invention will become apparent from the following description and illustrative examples.

I have discovered a novel, high molecular weight homopolymer of a monomer consisting of the vinyl cyclobutane resulting from the cyclization reaction of 1,1-difluoro-2,2-dichloroethylene and a member selected from the group consisting of butadiene-1,3, chloroprene and isoprene. Less preferred but also included herein as reactants with 1,1-dichloro-2,2-difluoroethylene are 2,3-dimethyl butadiene-1,3, 2,3-dichloro butadiene-1,3 and hexachloro butadiene-1,3.

The vinyl cyclobutane monomer used to prepare the homopolymeric product of this invention can be prepared by known methods as illustrated in the following reaction of 1,1-difluoro-2,2-dichloroethylene and butadiene-1,3.

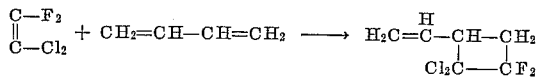

or

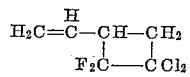

or both.

It can be seen that the resulting vinyl dichloro,difluoro cyclobutane can have two possible structures and at the present time it is not possible to say with certainty which is the right one. For this reason I define the monomer used to prepare my novel polymeric compositions as the vinyl cyclobutane reaction product of 1,1-difluoro-2,2-dichloroethylene and one of the aforementioned diene compounds. The possible vinyl cyclobutane reaction products of 1,1-difluoro-2,2-dichloroethylene and isoprene or chloroprene are one or more of a mixture of isomers as illustrated below in the reaction with isoprene.

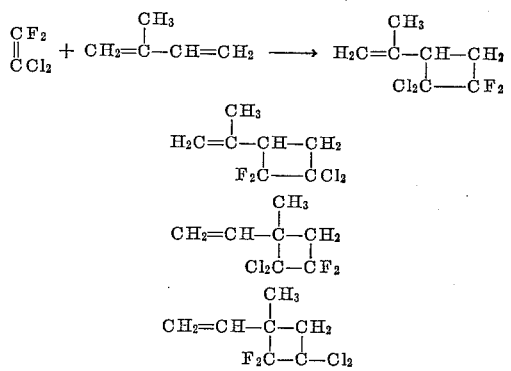

Most preferred in the preparation of the novel homopolymers of the present invention is the monomeric vinyl cyclobutane reaction product of 1,1-difluoro-2,2-dichloroethylene and butadiene-1,3 because of its ease of preparation, relatively low cost and the possibility of only two isomers forming. It is strongly believed that the monomeric reaction product of 1,1-difluoro-2,2-dichloroethylene and butadiene-1,3 consists of a single structure and this structure is probably

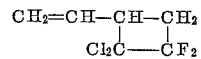

The reaction between 1,1-difluoro-2,2-dichloroethylene and a diene such as butadiene-1,3 is best carried out under pressure in a closed system at a temperature of from 50 to 300° C. and in the absence of oxygen and polymerization catalysts. Small amounts of a polymerization inhibitor such as phenyl beta-naphthyl amine, hydroquinone, di-t-butyl catechol and the like optionally may be employed in the reaction. The reaction can be carried out at subatmospheric, atmospheric or superatmospheric pressure. The equipment used can be constructed of glass or various metals such as iron, steel, stainless steel, aluminum, Monel metal or copper.

The novel homopolymers embodied herein in contrast to known prior art vinyl cyclobutane polymers are of relatively high molecular weight (in excess of 20,000 and preferably 50,000 and above). They have softening temperatures in excess of about 100° C. and have excellent resistance to common solvents and chemicals of most types as well as usually good heat and light stability. The halogenated vinyl cyclobutane polymers taught by the prior art, on the other hand, are brittle, of low softening temperature (considerably under 100° C.) and they have molecular weights of less than 10,000. It is obvious that materials having such properties are of little commercial interest. The unexpectedly excellent physical properties of the polymers of this invention make them most attractive for many commercial applications in contrast to the obvious inadequacy of the physical properties of the known vinyl cyclobutane polymers.

It has been discovered that homopolymers embodied herein having the best physical properties are prepared at higher polymerization temperatures such as from 100 to 250° C. and preferably from 130 to 160° C. These preferred polymerization conditions are indeed unobvious and contrary to the fact which is well accepted by those skilled in the art that an increase in the temperature of polymerization of a vinyl monomer will be accompanied by a decrease in the molecular weight and an increase in the brittleness of the polymeric product (see, for instance, "Principles of Polymer Chemistry," by Paul J. Flory, Cornell University Press, Ithaca, New York, 1953, page 145; "Vinyl and Related Polymers," by C. A. Schildknecht, John Wiley & Sons, Inc., New York, 1952, pages 5–7 and page 38; "Styrene, Its Polymers, Copolymers and Derivatives," by R. H. Boundy and R. F. Boyer, Reinhold Publishers, New York, 1952, page 306; and "Polymer Processes," edited by C. A. Schildknecht, Interscience Publishers, New York, 1956, pages 34 and 156).

The polymerization of the monomers embodied herein can be carried out without initiators other than heat, although it is preferred to use a free radical initiator such as azobisisobutyronitrile, di-t-butyl peroxide, acetyl-benzoyl peroxide, peracetic acid, hydroxy heptyl peroxide, isopropyl percarbonate, methyl ethyl ketone peroxide, cyclohexanone peroxide, cyclohexyl hydroperoxide, 2,4-dichlorobenzoyl peroxide, cumene hydroperoxide, t-butyl hydroperoxide, methyl amyl ketone peroxide, acetyl peroxide, technical lauroyl peroxide, benzoyl peroxide, methyl cyclohexyl hydroperoxide, t-butyl permaleic acid, t-butyl perbenzoate, di-t-butyl diperphthalate, t-butyl perphthalic acid, p-chlorobenzoyl peroxide, t-butyl peracetate, dibenzal diperoxide, and the like. Most preferred are the so-called high temperature initiators such as t-butyl perphthalic acid, p-chlorobenzoyl peroxide, t-butyl peracetate, di-t-butyl peroxide and dibenzal peroxide. When a catalyst is employed it is preferred to use from 0.01 to about 5% by weight based on the weight of monomer.

The homopolymers embodied herein can be prepared in bulk, in solution or in suspension preferably with a polymerization initiator. It is most preferred to prepare the homopolymers embodied herein in bulk or mass because of the excellent physical and chemical properties imparted to the products.

The homopolymers embodied herein and preferably those prepared at a temperature of from 130 to 160° C. possess a balance of physical properties not usually found in a single polymer. Films quenched from melts combine clarity, absence of color, high strength, high melting points and toughness with non-flammability and solvent resistance. The polymers of this invention are highly crystalline and are strongly affected by post-thermal treatment. Polymers of this type are useful as films, fibers and as injection molding resins.

In the following illustrative examples the amounts of ingredients are expressed in parts by weight unless otherwise indicated.

*Example I*

The vinyl cyclobutane reaction product of butadiene-1,3 and 1,1-dichloro-2,2-difluoroethylene is prepared in the following manner. A stainless steel bomb of 3 liter capacity is purged with nitrogen, 450 g. of butadiene-1,3 and 1370 g. of 1,1-dichloro-2,2-difluoroethylene are introduced into the bomb. The slight excess of the halogenated ethylene is used to minimize the formation of vinyl cyclohexene through dimerization of the butadiene-1,3. The bomb is then sealed and heated gradually over a period of from 90–120 minutes to 125° C. The temperature of reaction is maintained at 125° C. and the total reaction cycle is about 8 hours. An excessive temperature rise or even a detonation can occur unless the bomb is completely purged of air with nitrogen before charging the reactants and unless the sealed bomb and contents are brought to the reaction temperature gradually.

The reaction mixture is then cooled to room temperature and is stripped of residual 1,1-dichloro-2,2-difluoroethylene by evacuation at room temperature. The product is then purified by distillation at reduced pressure. The pure monomeric product boils at 80.5 to 81.0° C. at 90 mm. and has a refractive index of 1.4345 (at 25° C.). Chemical analysis shows the product is the 1:1 addition product of butadiene-1,3 and 1,1-dichloro-2,2-difluoroethylene. Infrared spectra and unsaturation determination are in agreement with a vinyl cyclobutane structure.

In the foregoing manner yields of from 86 to 94% of theory are obtained of the purified dichloro difluoro vinyl cyclobutane product.

Monomer prepared in the foregoing manner must be distilled carefully so that all impurities which may inhibit polymerization are removed. A scheme to determine whether monomer is satisfactory for polymerization was devised. Ten grams of monomer are polymerized at 140° C. in a sealed tube for five hours and the conversion (to solid polymer) measured. The conversion for the unfractionated monomer ranges from 22 to 32%. Conversions for the fractionated monomer indicates that the first fraction contains an inhibitor and that all the succeeding fractions are satisfactory. The first fraction from a monomer charge will give conversions to polymer ranging from 11 to 26%. Subsequent fractions polymerize to at least about 50% in this test.

In the foregoing monomer preparation reaction one can use a small amount of polymerization inhibitor such as hydroquinone, phenyl beta-naphthyl amine, di-t-butyl catechol, hydroquinone monoethyl ether and the like. When care is taken to remove all oxygen from the reaction system, however, no inhibitor is necessary.

In a similar fashion the reaction products of 1,1,2,2-tetrafluoroethylene-butadiene-1,3, 1-chloro-1,2,2,-trifluoroethylene-butadiene-1,3, 1,1-dichloro-2,2-difluoroethylene-isoprene and 1,1-dichloro-2,2-difluoroethylene-chloroprene were prepared.

*Example II*

The homopolymer of the vinyl cyclobutane reaction product of 1,1-dichloro-2,2-difluoroethylene and butadiene-1,3 described in detail in Example I was prepared in a bulk polymerization system. The reaction was carried out in a round-bottomed glass flask equipped with reflux condenser, mechanical stirrer, nitrogen inlet tube and an external heater. Into the flask were charged 1,000 g. of the monomer and 0.5 g. of dietertiary butyl peroxide. The mixture was then continuously stirred and flushed with nitrogen and the reactio ntemperature was brought to 130° C. The polymer formed and eventually the reaction mixture became opaque and reached the consistency of thin dough in about 7 hours. The reaction mass was allowed to cool to room temperature and there resulted a friable solid cake which was easily broken up and removed from the flask. The solid polymer was triturated in a mechanical blender in methanol followed by isolation of the fine solid and vacuum drying at 100–150° C. for several hours. The dry polymeric product had a softening point on the melting point block of from about 180 to 190° C. and was soluble at room temperature in pyridine but was insoluble in tetrahydrofuran, 1,4-dioxane, acetone, methyl ethyl ketone, dimethyl formamide, ethylene dichloride, o-xylene, hexane, benzene, chlorobenzene, nitrobenzene, nitromethane, acetophenone, diisopropyl ether, quinoline, alpha-picoline, 2,3-dihydropyran, dichlorodiethyl ether, isophorone, dipentene, pinene, ethanol, diethylene glycol and the diethyl ether of diethylene glycol. 1,2-dibromo-2-chloroethane was found to be at least a partial solvent for the polymer. The molecular weight of this polymer was in excess of 20,000.

Similarly homopolymers prepared from the reaction products of (a) 1,1-dichloro-2,2-difluoroethylene and isoprene and (b) 1,1-dichloro-2,2-difluoroethylene and chloroprene were prepared and were found to be of high softening temperature and of high molecular weight with similar solubility characteristics.

*Example III*

A series of mass polymerized homopolymers of the reaction product of 1,1-dichloro-2,2-difluoroethylene and butadiene-1,3 were prepared in sealed tubes using 10 grams of polymer in each tube with the initiator, time and at the temperature shown below. The induction period is the time required for the first onset of cloudiness in the monomer after the polymerization temperature is reached.

| Percent Initiator | Temperature, °C. | Time, hours | Induction Period, min. | Percent Yield | Atmosphere in tube |
|---|---|---|---|---|---|
| None | 150 | 6.25 | | 13.1 | air. |
| 0.3 azobisisobutyronitrile | 132 | 20 | 10 | 24.4 | air. |
| 0.36 di-t-butyl peroxide | 132 | 21.5 | 90 | 81.9 | air. |
| Do | 132 | 4.5 | 80 | 74.7 | air. |
| Do | 133 | 4.5 | 85 | 49.4 | Oxygen free. |
| 0.12 di-t-butyl peroxide | 137 | 4.0 | 90 | 50.7 | Do. |
| Do | 135 | 4.0 | 90 | 52.1 | Do. |
| 0.24 di-t-butyl peroxide | 143 | 2.25 | 60 | 66.9 | Do. |
| Do | 106 | 142.5 | | 17.0 | Do. |
| 0.087 di-t-butyl peroxide | 130 | 6.5 | | 46.5 | Do. |
| 0.058 di-t-butyl peroxide | 153 | 1.25 | | 44.9 | Do. |
| 0.087 di-t-butyl peroxide | 156 | 1.25 | | 48.4 | Do. |

Each of the above polymeric products was molded to a flexible, clear, transparent film in 15 seconds at 470° F. under 400 p.s.i. in a platen press. The softening points for the above polymers as determined on a hot stage all were in the range of 180–190° C. The foregoing demonstrates that the homopolymer is of exceedingly high molecular weight and has unusually good heat stability being admittedly suited for injection molding applications.

A homopolymer of the above type prepared at 150° C. was melted and fibers were spun from the melt. The fibers were then drawn and evaluated.

| Drawing | grams/denier | elongation |
|---|---|---|
| Drawn at room temperature | 1.45 | 28 |
| Drawn at 100° C | 1.8 | 9 |

X-ray spot diagrams run on the drawn fibers showed them to be highly crystalline.

Two grams of a homopolymer of the vinyl cyclobutane reaction product of 1,1-dichloro-2,2-difluoroethylene and butadiene-1,3 were pressed between Ferrotype plates using aluminum foil liners in a platen press at 225° C. and 7000 pounds pressure on the platens for exactly two minutes. The plates and the fused polymer were then removed from the press and quenched with cold water. An extremely clear, colorless film resulted. If, rather than quenching the film, the polymer is allowed to cool under pressure in the press, an opaque, white, brittle, highly crystalline film is obtained. A quenched film of the foregoing type was found to have a density of 1.5174 g./ml. whereas an annealed, opaque film was found to have a density of 1.5479 g./ml. The quenched film was found to have a tensile strength of 7000 p.s.i. and was very flexible. The annealed film was found by X-ray analysis to be highly crystalline.

In accordance with the teachings of U.S. Patent No. 2,462,347 the vinyl cyclobutane reaction product of 1,1,2,2-tetrafluoroethylene and butadiene-1,3 was polymerized at 100° C. in the presence of 1% benzoyl peroxide. A conversion of 12% polymer was obtained in 22 hours. The polymeric product was found to have a softening point (hot stage) of from 65 to 70° C. and a cryoscopic molecular weight of 1800–1900. This polymer was found to be very brittle and soluble in acetone, benzene, ethyl acetate and dioxane. A similar polymer was obtained when the polymerization was carried out in the presence of air.

In order to eliminate the possibility of inhibition of this polymerization by impurities present in the monomer, an "exhaustive polymerization" procedure was used wherein the unpolymerized monomer is recycled to a new reactor after partial polymerization and a second polymerization reaction is again initiated and so on. Impurities should be removed with the low molecular weight polymer formed in the first reaction and subsequent polymerization of the recovered monomer should yield high molecular weight polymer. However, no polymer having a molecular weight in excess of 2,000 was obtained in this fashion and no softening points above 70° C. were observed.

The reaction product of 1,1,2,2-tetrafluoroethylene and butadiene-1,3 was homopolymerized at 150° C. in the presence of di-t-butyl peroxide. Less than 5% polymer was obtained in 20 hours and this polymer was found to be brittle and to have a softening temperature (hot stage) of 60–65° C. The exhaustive polymerization procedure mentioned above did not yield any polymer of higher molecular weight or higher softening temperature.

The vinyl cyclobutane reaction product of 1-chloro-1,2,2-trifluoroethylene butadiene-1,3 was homopolymerized at 100° C. in the presence of 1% benzoyl peroxide. In about 20 hours a yield of 9.83% of polymer was obtained. It was found that the 1.2% of this polymer which was insoluble in methanol was very brittle and had a softening temperature of 65–75° C. and that the remaining methanol soluble portion had a softening temperature of less than 22° C. The methanol-insoluble polymer had a cryoscopic molecular weight of 4,000 to 5,000. A slightly higher yield of polymer was obtained at 150° C. in the presence of di-t-butyl peroxide which had the same physical and chemical properties. No higher molecular weight or higher softening polymer was obtained when the exhaustive polymerization procedure described above was employed with this monomer.

The mass polymerization of the reaction product of 1,1-dichloro-2,2-difluoroethylene and butadiene at 100° C. in the presence of 1% benzoyl peroxide gave a yield of only 20% of a polymer which could be fused to a flexible film at 450° F. and was insoluble in acetone, benzene, xylene, dioxane, ethyl acetate and other common solvents and had a softening temperature of 180 to 185° C. and a molecular weight of above 20,000.

Efforts to react 1,1-difluoroethylene with butadiene-1,3 were unsuccessful. No vinyl cyclobutane monomer was obtained in seven separate attempts wherein temperatures ranging from 125 to 175° C. were employed. At the higher temperature 10% of a liquid boiling at 125–126° C. was obtained which was positively identified by infrared analysis as vinyl cyclohexene (resulting from the self-condensation of butadiene).

*Example IV*

A stirred mixture of 40 g. of the vinyl cyclobutane reaction product of 1,1-dichloro-2,2-difluoroethylene and butadiene-1,3 in 100 g. of water was heated to 95° C. and maintained at this temperature for 6 hours during which time increments of potassium persulfate totaling 0.72 g. were added. A yield of 73.45% of polymer softening at 180–190° C. was obtained in this time. Stable emulsions can be prepared in this manner using conventional emulsifiers in the polymerization recipe. No high softening, high molecular weight homopolymer resulted from the attempt to homopolymerize the vinyl cyclobutane reaction product of 1,1,2,2-tetrafluoroethylene and butadiene-1,3 in the foregoing manner.

I claim:
1. The homopolymer of a vinyl cyclobutane monomer which contains a ring of four saturated carbon atoms, said ring composed of a pair of adjacent carbon atoms, one of which has attached thereto two fluorine atoms and the other has attached thereto two chlorine atoms, an unsubstituted carbon atom and a fourth carbon atom to which is attached an ethylenically unsaturated side chain, said monomer being the addition reaction product of one mol of 1,1-dichloro-2,2-difluoroethylene and one mol of member selected from the group consisting of butadiene-1,3, chloroprene and isoprene, said homopolymer characterized by having a molecular weight greater than 20,000, a softening point greater than 100 C. and being insoluble in dioxane.

2. The homopolymer of vinyl-dichloro-difluorocyclobutane monomer which contains a ring of four saturated carbon atoms, said ring composed of a pair of adjacent carbon atoms, one of which has attached thereto two fluorine atoms and the other has attached thereto two chlorine atoms, an unsubstituted carbon atom and a fourth carbon atom to which is attached the group

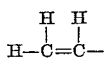

said monomer being the addition reaction product of one mol of 1,1-dichloro-2,2-difluoroethylene and one mol of butadiene-1,3, said homopolymer characterized by having a molecular weight greater than about 50,000, a softening point greater than 100° C. and being insoluble in dioxane.

3. The homopolymer of a vinyl cyclobutane monomer which contains a ring of four saturated carbon atoms, said ring composed of a pair of adjacent carbon atoms, one of which has attached thereto two fluorine atoms and the other has attached thereto two chlorine atoms, an unsubstituted carbon atom and a fourth carbon atom to which is attached an ethylenically unsaturated side chain, said monomer being the addition reaction product of one mol of 1,1-dichloro-2,2-difluorethylene and one mol of chloroprene, said homopolymer characterized by having a molecular weight greater than 50,000, a softening point greater than 100° C., and being insoluble in dioxane.

4. The homopolymer of a vinyl cyclobutane monomer which contains a ring of four saturated carbon atoms, said ring composed of a pair of adjacent carbon atoms, one of which has attached thereto two fluorine atoms and the other has attached thereto two chlorine atoms, an unsubstituted carbon atom and a fourth carbon atom to which is attached an ethylenically unsaturated side chain, said monomer being the addition reaction product of one mol of 1,1-dichloro-2,2-difluoroethylene and one mol of isoprene, said homopolymer characterized by having a molecular weight greater than 50,000, a softening point greater than 100° C. and being insoluble in dioxane.

5. The process comprising homopolymerizing at a tempertaure of from 100° to 250° C. a vinyl cyclobutane monomer which contains a ring of four saturated carbon atoms, said ring composed of a pair of adjacent carbon atoms, one of which has attached thereto two fluorine atoms and the other has attached thereto two chlorine atoms, an unsubstituted carbon atom and a fourth carbon atom to which is attached an ethylenically unsaturated side chain, said monomer being the addition reaction product of one mol of 1,1-dichloro-2,2-difluoroethylene and one mole of a member selected from the group consisting of butadiene-1,3 chloroprene and isoprene.

6. The homopolymer of claim 1 having a molecular weight greater than about 50,000.

7. The process of claims wherein the temperature is from 130 to 160° C.

8. The process of claim 5 wherein from 0.01 to 5% by weight, based on the weight of the monomer, of a free radical initiator is employed.

9. The process of claim 8 wherein the vinyl cyclobutane monomer is the equimolar addition reaction product of 1,1-dichloro-2,2-difluoroethylene and butadiene-1,3.

References Cited in the file of this patent

UNITED STATES PATENTS

| 2,462,345 | Barrick | Feb. 22, 1949 |
| 2,462,346 | Barrick | Feb. 22, 1949 |
| 2,462,347 | Barrick | Feb. 22, 1949 |

FOREIGN PATENTS

| 863,721 | Great Britain | Mar. 22, 1961 |